(12) United States Patent
Wang (10) Patent No.: US 10,091,054 B2
(45) Date of Patent: Oct. 2, 2018

(54) CONTROLLING FORWARDING DEVICES IN SOFTWARE DEFINED NETWORKS

(71) Applicant: Hangzhou H3C Technologies Co., Ltd., Hangzhou (CN)

(72) Inventor: Yunyi Wang, Beijing (CN)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 52 days.

(21) Appl. No.: 14/899,942

(22) PCT Filed: Aug. 22, 2014

(86) PCT No.: PCT/CN2014/084980
§ 371 (c)(1),
(2) Date: Dec. 18, 2015

(87) PCT Pub. No.: WO2015/024527
PCT Pub. Date: Feb. 26, 2015

(65) Prior Publication Data
US 2016/0156504 A1    Jun. 2, 2016

(30) Foreign Application Priority Data

Aug. 23, 2013 (CN) .......................... 2013 1 0371598

(51) Int. Cl.
*H04L 12/24* (2006.01)
*H04L 12/707* (2013.01)
(Continued)

(52) U.S. Cl.
CPC ........ *H04L 41/0668* (2013.01); *H04L 12/462* (2013.01); *H04L 12/6418* (2013.01);
(Continued)

(58) Field of Classification Search
CPC ..... H04L 41/0668; H04L 45/28; H04L 49/35; H04L 49/557; H04L 45/745;
(Continued)

(56) References Cited

U.S. PATENT DOCUMENTS

| 8,448,238 B1 | 5/2013 | Gupta et al. |
| 2004/0085954 A1 | 5/2004 | Iacovino et al. |

(Continued)

FOREIGN PATENT DOCUMENTS

| CN | 101164265 | 4/2008 |
| CN | 102651701 | 8/2012 |

(Continued)

OTHER PUBLICATIONS

International Search Report and Written Opinion dated Nov. 28, 2014, PCT Patent Application No. PCT/CN2014/084980 dated Aug. 22, 2014 (ISA/CN).

Sharma, S. et al., "OpenFlow: Meeting Carrier-Grade Requirements", DRCN Paper, Dec. 13, 2011.

*Primary Examiner* — Kwang B Yao
*Assistant Examiner* — Moo Ryong Jeong
(74) *Attorney, Agent, or Firm* — Hewlett Packard Enterprise Patent Department (57) ABSTRACT

A first forwarding device in a software defined network (SDN) detects disconnection of an out-band connection between the first forwarding device and a controller, sends an SDN packet to the controller via an out-band connection of a second forwarding device adjacent to the first forwarding device, and receives a response packet sent by the controller via the second forwarding device.

13 Claims, 5 Drawing Sheets

(51) Int. Cl.
*H04L 12/939* (2013.01)
*H04L 12/741* (2013.01)
*H04L 12/703* (2013.01)
*H04L 12/931* (2013.01)
*H04L 12/46* (2006.01)
*H04L 12/64* (2006.01)

(52) U.S. Cl.
CPC .......... *H04L 41/0695* (2013.01); *H04L 45/22* (2013.01); *H04L 45/28* (2013.01); *H04L 45/745* (2013.01); *H04L 49/35* (2013.01); *H04L 49/557* (2013.01)

(58) Field of Classification Search
CPC ............... H04L 41/0695; H04L 12/462; H04L 12/6418; H04L 45/22
See application file for complete search history.

(56) References Cited

U.S. PATENT DOCUMENTS

| | | | | |
|---|---|---|---|---|
| 2007/0127385 | A1* | 6/2007 | Yasuie | H04L 12/462 370/242 |
| 2011/0286324 | A1* | 11/2011 | Bellagamba | H04L 41/0677 370/219 |
| 2014/0119193 | A1* | 5/2014 | Anand | H04L 45/28 370/237 |
| 2015/0381476 | A1* | 12/2015 | Oshima | H04L 12/4625 370/219 |

FOREIGN PATENT DOCUMENTS

| | | |
|---|---|---|
| CN | 102714627 A | 10/2012 |
| CN | 102916887 | 6/2013 |
| EP | 2544409 | 1/2013 |
| ID | 2013104375 | 7/2013 |

* cited by examiner

CONTROLLING FORWARDING DEVICES IN SOFTWARE DEFINED NETWORKS

CLAIM FOR PRIORITY

The present application is a national stage filing under 35 U.S.C. § 371 of PCT application number PCT/CN2014/084980, having an international filing date of Aug. 22, 2014, which claims priority to Chinese patent application number 201310371598.0, having a filing date of Aug. 23, 2013, the disclosures of which are hereby incorporated by reference in their entireties.

BACKGROUND

Software Defined Network (SDN) is different from conventional networks in that it has a separated control plane and network forwarding plane. The network forwarding plane does not have control functions, and the control plane may be controlled by an operating system independent from the forwarding plane. Characteristics may be customized in the operating system.

OpenFlow is one example of a standard defining communication interfaces between controllers and forwarding layer in an SDN architecture. OpenFlow allows direct access and controlling of the forwarding plane of network devices. The network devices may be physical devices or virtual devices.

According to SDN, the control plane and the data plane are separated, and communicate with each other using defined protocols. The data plane forwards data based on flow.

BRIEF DESCRIPTION OF THE DRAWINGS

Features of the present disclosure are illustrated by way of example and not limited in the following figures, in which like numerals indicate like elements, in which.

DETAILED DESCRIPTIONS

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the term "includes" means includes but not limited to, the term "including" means including but not limited to. The term "based on" means based at least in part on. Quantities of an element, unless specifically mentioned, may be one or a plurality of, or at least one.

An SDN includes one or more SDN forwarding devices. It may implement secure channels between the SDN forwarding devices and SDN controllers.

The controllers form the control plane in the SDN architecture. Controllers send various commands via the secure channels to control the SDN switches. Users may customize the control plane through programming, and thus define the whole network.

Matching tables store matching table entries that are sent from a controller to an SDN forwarding device. Packets are matched with different matching domains, and then are processed through different processing procedures. In an example, SDN forwarding devices may be SDN switch, the matching tables may be flow tables, and the matching table entries may be flow table entries.

Controller-bound packets are for delivering packets to controllers. All packets, both packets matched with a matching table entry and packets matched with no matching table entry (also referred to as table miss) which are thus to be sent to a reserved interface of a controller, should be sent to a controller through controller-bound packets. A controller-bound packet may include the entire packet which is to be delivered to the controller. Alternatively, a buffer may be configured within an SDN forwarding device to store packets, and only packet headers and a buffer ID of the packet may be sent to the controller via a controller-bound packet. After receiving a controller-bound packet, the controller may process the packet or packet header and buffer ID in the controller-bound packet, and return a controller-sent packet to the SDN forwarding device informing the SDN forwarding device of the manner of processing the packet. In an example, SDN forwarding devices may be SDN switch, the controller-bound packets may be Packet-in packets.

Controller-sent packets are used by controllers for sending packets to SDN forwarding devices via specific interfaces of the SDN forwarding devices. Controller-sent packets generally include the packet or buffer ID in previously received controller-bound packet. Controller-sent packets may include an action list. An SDN forwarding device may perform actions in the action list on the packet in the controller-sent packet. In an example, SDN forwarding devices may be SDN switch, controller-sent packets may be packet-out packets.

Controllers communicate with SDN forwarding devices via specific management interfaces to control the SDN forwarding devices, and this control manner is referred to as out-band control. The connection between the specific management interface of a controller and a forwarding device is referred to as an out-band connection.

When a controller in an SDN network adopts out-band control manner, i.e., communicate with an SDN forwarding device via a specific management interface of the SDN forwarding device. When the out-band connection between the controller and the SDN forwarding device is disconnected, the control of the controller on the SDN forwarding device is also severed.

Figure 1:
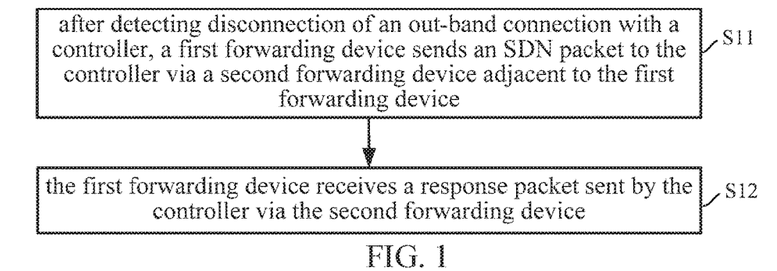
FIG. 1 is a flowchart illustrating a method for processing a disconnected out-band connection according to various examples of the present disclosure.

FIG. 1 is a flowchart illustrating a method for processing a disconnected out-band connection according to various examples of the present disclosure. As shown in FIG. 1, the method may include the following procedures.

At block S11, when a first forwarding device in an SDN detects disconnection of an out-band connection with a controller, an SDN packet is sent to the controller via an out-band connection of a second forwarding device adjacent to the first forwarding device.

At block S12, the first forwarding device receives a response packet sent by the controller via the second forwarding device.

When detecting an out-band connection with the controller is disconnected, the first forwarding device creates a local in-band control matching table entry in a first matching table. The local in-band control matching table entry is of the highest priority. In the local in-band control matching table entry, a match field is set to indicate matching the source address of a packet with the address of the controller, e.g., in the form of "source address: address value" in which the address value is the address of the controller, an action indicates a packet having the source address is to be processed by the local device, i.e., the first forwarding device. Thus, a packet having the source address is sent to a local network protocol stack for processing, i.e., the packet is sent to a processor (e.g., a CPU) in the first forwarding device. As such, the first forwarding device is enabled to process the response packet sent by the controller via the second forwarding device.

The controller may control the first forwarding device through a forwarding interface (i.e., an interface other than management interface) of the first forwarding device. The manner of the controller controlling the first forwarding device is switched from out-band control to in-band control, i.e., control information is received by the first forwarding device via a forwarding interface (i.e., via an in-band connection).

In-band control refers to a controller communicate with an SDN forwarding device via a forwarding interface of the SDN forwarding device.

Figure 2:
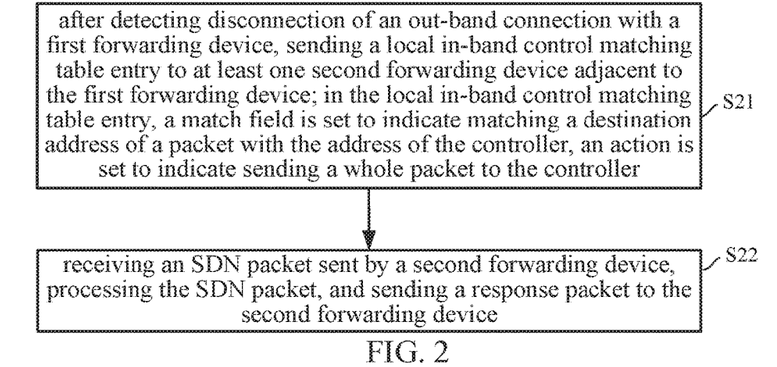
FIG. 2 is a flowchart illustrating a method of a controller processing a disconnected out-band connection with a forwarding device according to various examples of the present disclosure.

FIG. 2 is a flowchart illustrating a method of a controller processing a disconnected out-band connection with a forwarding device according to various examples of the present disclosure. As shown in FIG. 2, the method may include the following procedures.

At block S21, a controller detects disconnection of an out-band connection with a first forwarding device, sends a neighbor in-band control matching table entry to a forwarding device adjacent to the first forwarding device. In the neighbor in-band control matching table entry, a match field is set to indicate matching the destination address of a packet with the address of the controller, e.g., in the form of a "destination address: address value" in which the address value is the address of the controller, and an action indicates sending the whole packet to the controller.

At block S22, the controller receives an SDN packet of the first forwarding device forwarded by the forwarding device adjacent to the first forwarding device, processes the packet, and sends a response packet to the forwarding device adjacent to the first forwarding device.

Figure 3:
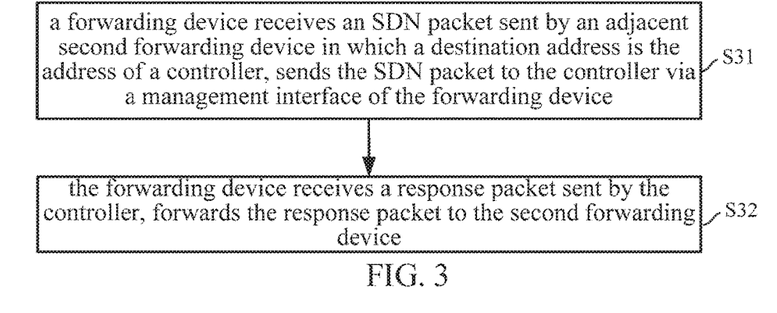
FIG. 3 is a flowchart illustrating a method of processing a disconnected out-band connection of an adjacent forwarding device according to various examples of the present disclosure.

FIG. 3 is a flowchart illustrating a method of processing a disconnected out-band connection of an adjacent forwarding device according to various examples of the present disclosure. As shown in FIG. 3, the method may include the following procedures.

At block S31, a forwarding device receives an SDN packet sent by an adjacent forwarding device whose destination address is the address of the controller, and sends the packet to the controller via a management interface of the forwarding device.

The forwarding device receiving the protocol packet sent by the adjacent forwarding device may send the protocol packet to the controller according to a neighbor in-band control matching table entry sent by the controller to the forwarding device.

At block S32, the forwarding device receives a response packet sent by the controller in response to the SDN packet, and forwards the response packet to the adjacent forwarding device.

In another example, a controller is connected to plural SDN forwarding devices via out-band connection. The connections between the controller and the SDN forwarding devices may be layer-2 connections or layer-3 connections. If the connections are layer-2 connections, the controller and the SDN forwarding devices may be identified by respective Media Access Control (MAC) addresses. If the connections are layer-3 connections, the controller and the SDN forwarding devices may be identified by respective IP addresses.

Figure 4:
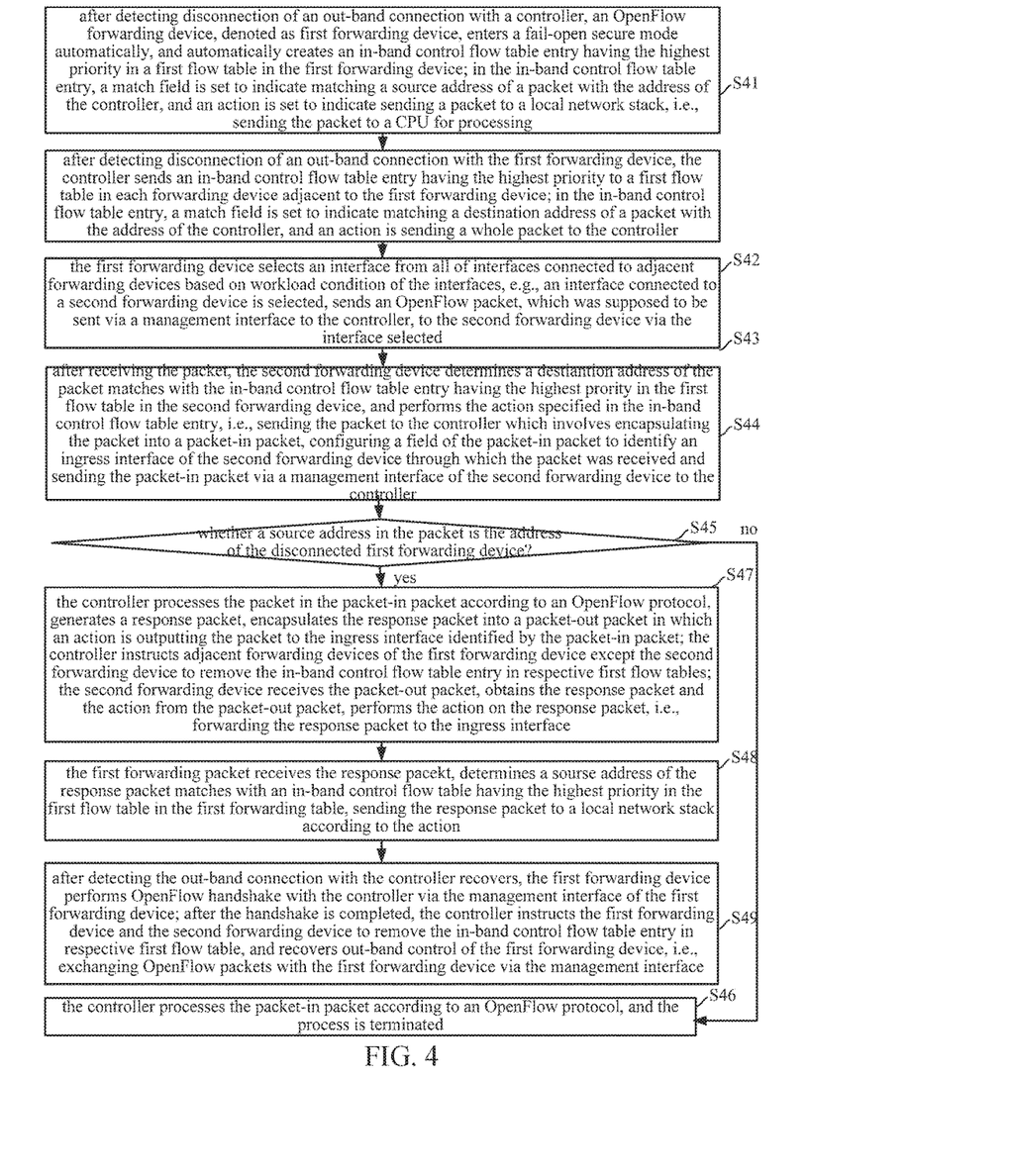
FIG. 4 is a flowchart illustrating a method for processing a disconnected out-band connection according to various examples of the present disclosure.

As shown in FIG. 4, the method may include the following procedures. FIG. 4 takes the OpenFlow protocol as an example of the SDN protocol. Implementations using other SDN protocols are similar to the process shown in FIG. 4 and will not be enumerated herein. In the following process, an OpenFlow forwarding device is taken as an example of an SDN forwarding device, an OpenFlow packet taken as an example of an SDN packet, a packet-in packet taken as an example of a controller-bound packet, a packet-out packet taken as an example of a controller-sent packet, a flow table taken as an example of a matching table, and a flow table entry taken as a matching table entry. The process can be applied to other SDN networks.

At block S41, when an OpenFlow forwarding device, e.g., a first forwarding device, detects an out-band connection between the first forwarding device and a controller is disconnected, the first forwarding device creates a local in-band control flow table entry in a first flow table in the first forwarding device. The local in-band control flow table entry is of the highest priority. In the local in-band control flow table entry, a match field is set to indicate matching the source address of a packet with the address of the controller, e.g., in the form of a "source address is: address value" in which the address value is the address of the controller, an action indicates the packet having the source address is to be processed by the first forwarding device, i.e., sending the packet to a local network protocol stack for processing.

The controller and the OpenFlow forwarding device may send an echo packet to each other at regular intervals. If the echo packet is not received within a pre-defined period of time, it is determined the out-band connection between the controller and the OpenFlow forwarding device is disconnected.

At block S42, when a controller detects an out-band connection with a first forwarding device is disconnected, the controller sends a neighbor in-band control flow table entry to each forwarding device adjacent to the first forwarding device via respective management interfaces. The neighbor in-band control flow table entry is of the highest priority. In the neighbor in-band control flow table entry, a match field is set to indicate matching the destination address of a packet with the address of the controller, e.g., in the form of a "destination address: address value" in which the address value is the address of the controller, an action indicates sending a whole packet to the controller.

At block S43, the first forwarding device selects an interface from interfaces to all of the adjacent forwarding devices based on workload conditions of the interfaces, supposing the selected interface is an interface connected to a second forwarding device, and sends an OpenFlow packet, to the second forwarding device via the interface selected.

When selecting the interface for sending the OpenFlow packet, the first forwarding device may select an interface having the largest idle bandwidth per unit-time by default. For example, there are two forwarding devices adjacent to the first forwarding device. Supposing there are a total of 40 Gbps of bandwidth between the first forwarding device and the second forwarding device with a workload of 20 Gbps, and there are a total of 30 Gbps of bandwidth between the first forwarding device and a third forwarding device with a workload of 15 Gbps, the first forwarding device may choose to send the OpenFlow packet to the second forwarding device.

At block S44, after receiving the packet, the second forwarding device determines the destination address of the packet matches with a neighbor in-band control flow table entry having the highest priority in the first flow table in the second forwarding device, sends the whole packet to the controller according to an action in the neighbor in-band control flow table entry. The second forwarding device may encapsulate the packet into a packet-in packet, configure a field of the packet-in packet to identify an ingress interface of the second forwarding device, and send the packet-in packet to the controller through a management interface of the second forwarding device.

At block S45, the controller receives the packet-in packet, judges whether source address of the packet encapsulated in the packet-in packet is the address of the first forwarding device whose out-band connection is disconnected, performs the procedure in block S47 if the source address of the packet is the address of the first forwarding device, or performs the procedure in block S46 if the source address of the packet is not the address of the first forwarding device.

At block S46, the controller processes the packet-in packet according to an OpenFlow protocol. The process is terminated.

At block S47, the controller processes the packet in the packet-in packet according to the OpenFlow protocol, creates a response packet, and encapsulates the response packet and an action into a packet-out packet, and sends the packet-out packet to the second forwarding device. The action is outputting the packet to the ingress interface identified by the packet-in packet. The controller instructs all of forwarding devices adjacent to the first forwarding device except for the second forwarding device to remove the neighbor in-band control flow table entry in respective first flow tables. The second forwarding device receives the packet-out packet, obtains the response packet and the action, applies the action on the response packet, i.e., forwarding the response packet to the ingress interface identified by the packet-in packet.

The ingress interface identified by the packet-in packet is the ingress interface of the second forwarding device that receives the OpenFlow packet sent by the first forwarding device. The second forwarding device may send the response packet in the packet-out packet to the first forwarding device via the ingress interface.

At block S48, the first forwarding device receives the response packet, determines the source address of the response packet matches with a local in-band control flow table entry which is of the highest priority in the first flow table in the first forwarding device, and sends the response packet to a local network protocol stack according to an action in the flow table entry which indicates sending the packet to the local network protocol stack.

As such, the controller may control the first forwarding device via the second forwarding device.

At block S49, after detecting the out-band connection with the controller recovers, the first forwarding device performs a handshake, e.g., an OpenFlow handshake, with the controller via the management interface of the first forwarding device. After the handshake is completed, the controller instructs the first forwarding device and the second forwarding device to remove the local in-band control flow table entry and the neighbor in-band control flow table entry in respective first flow tables, and stops sending OpenFlow packets to the first forwarding device via the second forwarding device. The controller recovers out-band control over the first forwarding device, i.e., exchanging OpenFlow packets with the first forwarding device via the management interface of the first forwarding device.

In block S43 as shown in FIG. 4, if the first forwarding device does not receive the response packet from the controller within a pre-defined period of time after sending the OpenFlow packet to the second forwarding device, the first forwarding device may re-select another adjacent forwarding device, e.g., selecting an interface having the second largest idle bandwidth per unit-time. Supposing the interface connected to the third forwarding device is selected, the first forwarding device may re-send the OpenFlow packet to the interface to the third forwarding device. Subsequent processing procedures may be similar to those in blocks S44 to S49 (i.e., the third forwarding device performs the procedures performed by the second forwarding device in blocks S44 to S49).

Figure 5:
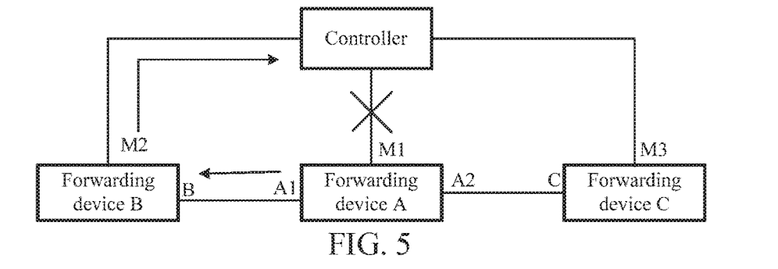
FIG. 5 is a schematic diagram illustrating an SDN in accordance with various examples of the present disclosure.

According to an example as shown in FIG. 5, an SDN network may include a controller and plural forwarding devices, e.g., forwarding devices A, B and C. The controller is connected to the forwarding devices A, B, C respectively via management interfaces M1, M2 and M3, i.e., in the out-band control mode. The forwarding devices are interconnected via forwarding interfaces, e.g., forwarding device A is connected with forwarding device B via forwarding interface B, and is connected with forwarding device C via forwarding interface C.

When the out-band connection between forwarding device A and the controller is disconnected, forwarding device A creates a local in-band control flow table entry in a first flow table in the forwarding device A. The local in-band control flow table entry is of the highest priority. In the local in-band control flow table entry, a source IP address is the IP address of the controller, and an action is sending a packet to a local network protocol stack. The controller may send a neighbor in-band control flow table entry to respective first flow tables of forwarding devices B and C which are adjacent to the forwarding device A via management interfaces M2 and M3. The neighbor in-band control flow table entry is of the highest priority. In the neighbor in-band control matching table entry, a match field is set to indicate matching the destination IP address of a packet with the IP address of the controller, e.g., in the form of "destination IP address: address value" in which the address value is the IP address of the controller, and an action indicates sending a whole packet to the controller.

The forwarding device A selects an interface, e.g., interface A1, based on workload conditions of interfaces A1 and A2, and sends the SDN packet via the interface A1.

After receiving the SDN packet, the forwarding device B determines the destination IP address of the SDN packet matches with the neighbor in-band control matching table entry having the highest priority in the first matching table in the forwarding device B, encapsulates the SDN packet into a packet-in packet, configure a field of the packet-in packet to identify the ingress interface B of the second forwarding device through which the SDN packet is received, and sends the packet-in packet to the controller through the management interface M2 of the forwarding device B according to the action in the neighbor in-band control matching table entry which indicates sending a whole packet to the controller.

The controller receives the packet-in packet. After determining the source IP address of the received packet is the IP address of the forwarding device A whose out-band connection is disconnected, the controller processes the packet according to an SDN protocol, creates a response packet. The controller encapsulates the response packet into a packet-out packet, sets an action in the packet-out packet to be outputting the packet to an ingress interface B identified by the packet-in packet, and sends the packet-out packet to the forwarding device B. The controller may also instructs the forwarding device C via the management interface M3 to remove the neighbor in-band control matching table entry in the first matching table in the forwarding device C.

The forwarding device B receives the packet-out packet, obtains the response packet and the action from the packet-out packet, performs the action on the response packet, i.e., sending the response packet to the interface B.

The forwarding device A receives the response packet, determines the source IP address of the response packet matches with the local in-band control matching table entry in the first matching table in the forwarding device A, and sends the response packet to a local network protocol stack according to the action in the local in-band control matching table entry.

According to a method for processing a disconnected out-band connection of another example, a controller is connected to plural SDN forwarding devices via respective management interface. The connections between the controller and the SDN forwarding devices may be layer-2 connections or layer-3 connections. If the connections are layer-2 connections, the controller and the SDN forwarding devices may be identified by respective MAC addresses. If the connections are layer-3 connections, the controller and the SDN forwarding devices may be identified by respective IP addresses.

Figure 6:
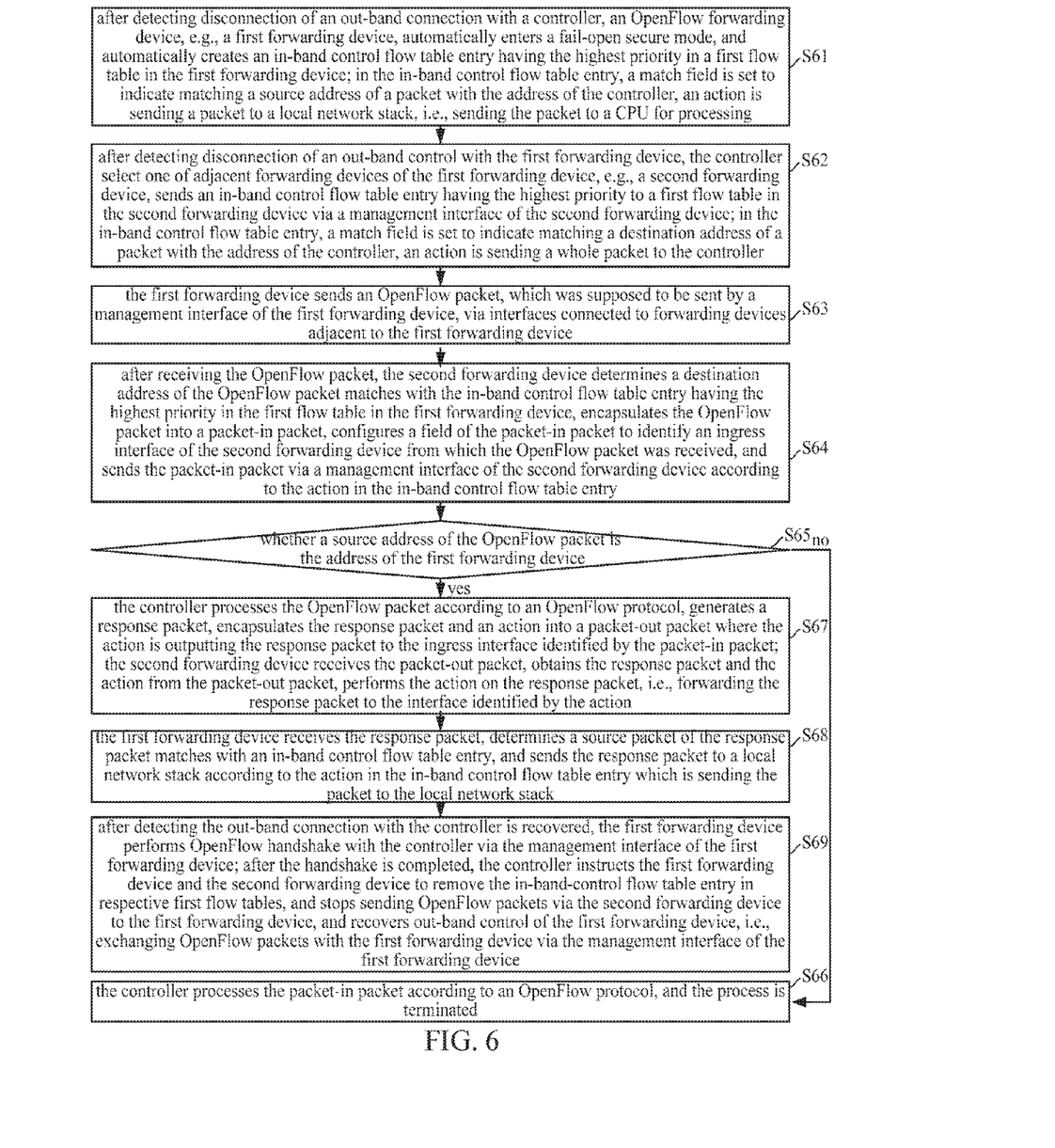
FIG. 6 is a flowchart illustrating a method for processing a disconnected out-band connection according to various examples of the present disclosure.

As shown in FIG. 6, the method may include the following procedures. FIG. 6 takes the OpenFlow protocol as an example of the SDN protocol. Implementations using other SDN protocols are similar to the process shown in FIG. 6 and will not be enumerated herein. In the following process, an OpenFlow forwarding device is taken as an example of an SDN forwarding device, an OpenFlow packet taken as an example of an SDN packet, a packet-in packet taken as an example of a controller-bound packet, a packet-out packet taken as an example of a controller-sent packet, a flow table taken as an example of a matching table, and a flow table entry taken as a matching table entry. The process can be applied to other SDN networks.

At block S61, when an OpenFlow forwarding device, e.g., a first forwarding device, detects disconnection of an out-band connection with the controller. The first forwarding device creates a local in-band control flow table entry having the highest priority in the first flow table of the first forwarding device. In the local in-band control flow table entry, a match field is set to indicate matching the source address of a packet with the address of the controller, e.g., in the form of a "source address is: address value" in which the address value is the address of the controller, and an action indicates sending a packet to a local network protocol stack, i.e., sending the packet to the CPU for processing.

At block S62, when the controller detects an out-band connection with the first forwarding device is disconnected, the controller selects one of neighbor forwarding devices of the first forwarding device, e.g., a second forwarding device, sends a neighbor in-band control flow table entry having the highest priority to the second forwarding device via a management interface of the second forwarding device. In the neighbor in-band control flow table entry, a match field is set to indicate matching the destination address of a packet with the address of the controller, e.g., in the form of a "destination address: address value" in which the address value is the address of the controller, and an action indicates sending a whole packet to the controller.

For example, the controller may select a forwarding device which has the smallest workload in all of forwarding devices adjacent to the first forwarding device.

At block S63, the first forwarding device sends the OpenFlow packet via interfaces between the first forwarding device and the adjacent forwarding devices.

For any OpenFlow packet, the first forwarding device may send the OpenFlow packet to all of adjacent forwarding devices.

At block S64, after receiving the packet, the second forwarding device determines the destination address of the packet matches with a neighbor in-band control flow table entry having the highest priority in the first flow table in the second forwarding device, sends the whole packet to the controller according to an action in the neighbor in-band control flow table entry. The second forwarding device may encapsulate the packet into a packet-in packet, configure a field of the packet-in packet to identify an ingress interface of the second forwarding device through which the Open-Flow packet is received, and send the packet-in packet to the controller through a management interface of the second forwarding device.

Other forwarding devices adjacent to the first forwarding device may discard the OpenFlow packet due to miss match of the destination address of the OpenFlow packet with any in-band control flow table entry.

At block S65, the controller receives the packet-in packet, judges whether source address of the packet in the packet-in packet is the address of the first forwarding device whose out-band connection is disconnected, performs the procedure in block S67 if the source address of the packet is the address of the first forwarding device, or performs the procedure in block S66 if the source address of the packet is not the address of the first forwarding device.

At block S66, the controller processes the packet-in packet according to OpenFlow protocol. The process is terminated.

At block S67, the controller processes the OpenFlow packet in the packet-in packet according to an OpenFlow protocol, creates a response packet, encapsulates the response packet and an action into a packet-out packet. The action may be outputting the packet to the ingress interface identified by the packet-in packet. The second forwarding device receives the packet-out packet, obtains the response packet and the action from the packet-out packet, and performs the action on the response packet, i.e., sending the response packet to the interface identified by the action.

The ingress interface identified by the packet-in packet is the ingress interface of the second forwarding device that receives the OpenFlow packet sent by the first forwarding device. The second forwarding device may send the response packet in the packet-out packet to the first forwarding device via the ingress interface.

At block S68, the first forwarding device receives the response packet, determines the source address of the response packet matches with a local in-band control flow table entry which is of the highest priority in the first flow table in the first forwarding device, and sends the response packet to a local network protocol stack according to an action in the flow table entry which indicates sending the packet to the local network protocol stack.

As such, the controller may control the first forwarding device via the second forwarding device.

At block S69, after detecting the out-band connection with the controller recovers, the first forwarding device performs OpenFlow handshake with the controller via the management interface of the first forwarding device. After the OpenFlow handshake is completed, the controller instructs the first forwarding device and the second forwarding device to remove the local in-band control flow table entry and the neighbor in-band control flow table entry in respective first flow tables, and stops sending OpenFlow packets to the first forwarding device via the second forwarding device. The controller recovers out-band control over the first forwarding device, i.e., exchanging OpenFlow packets with the first forwarding device via the managing interface of the first forwarding device.

In the process as shown in FIG. 6, if the controller does not receive a packet from the first forwarding device within a pre-defined period of time, e.g., no echo packet is received from the first forwarding device within 3 echo periodicity, the controller may re-select a forwarding device from the forwarding devices adjacent to the first forwarding device, supposing the third forwarding device is selected, send an in-band control flow table entry having the highest priority to the first flow table of the third forwarding device via a management interface of the third forwarding device. In the in-band control flow table entry, a match field is set to indicate matching the destination address of a packet with the address of the controller, e.g., in the form of a "destination address: address value" in which the address value is the address of the controller, and an action indicates sending a whole packet to the controller. The third forwarding device sends the OpenFlow packet sent by the first forwarding device to the controller.

According to the examples as shown in FIG. 4 and FIG. 6, under the layer-2 or layer-3 network out-band control mode, backup connections between a controller and a forwarding device are provided, i.e., when an out-band connection is disconnected, control functions are automatically switched to an in-band control connection. As such, out-band control connections are backup by in-band control connections.

Figure 7:
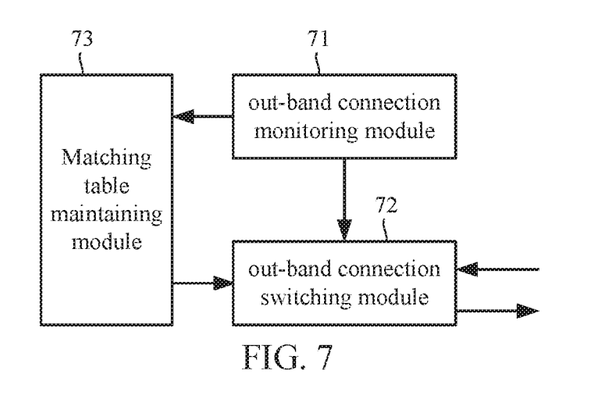
FIG. 7 is a schematic diagram illustrating modules of a forwarding device in accordance with various examples of the present disclosure.

FIG. 7 is a schematic diagram illustrating modules of a forwarding device. The forwarding device may be disposed in an SDN. The forwarding device may be controlled by a controller via out-band control. As shown in FIG. 7, the forwarding device may include an out-band connection monitoring module 71 and an out-band connection switching module 72.

The out-band connection monitoring module 71 detects disconnection in an out-band connection between the forwarding device and a controller, and sends an out-band connection disconnected indication to the out-band connection switching module 72.

The out-band connection switching module 72 receives the out-band connection disconnected indication from the out-band connection monitoring module 71, sends an SDN, e.g., an OpenFlow packet, to the controller via an out-band connection of a second forwarding device adjacent to the forwarding device, and receives a response packet sent by the controller via the second forwarding device.

In an example, the forwarding device may also include a matching table maintaining module 73.

The out-band connection switching module creates a local in-band control matching table entry in a matching table of the forwarding device. In the local in-band control matching table entry, a match field is set to indicate matching the source address of a packet with the address of the controller, e.g., in the form of a "source address: address value" in which the address value is the address of the controller, and an action is sending a packet to a local processing logic. The out-band connection switching module sends the response packet to the local processing logic for processing according to the local in-band control matching table entry.

The matching table maintaining module 73 maintains the matching table.

In an example, the out-band connection switching module 72 selects one of forwarding devices that are adjacent to the forwarding device as the second forwarding device, and sends the SDN packet to the second forwarding device.

In an example, the out-band connection switching module 72 may select one of the forwarding devices that are adjacent to the forwarding device, sends the SDN packet to the controller via the selected adjacent forwarding device. The out-band connection switching module 72 may receive an SDN response packet, e.g., an OpenFlow response packet, forwarded by the selected adjacent forwarding device, search the matching table in the matching table maintaining module 73 for a table entry matching with a source IP address in the response packet. The out-band connection switching module 72 may find the source IP address matches with the local in-band control matching table entry having the highest priority in the first matching table, and sends the response packet to the local network protocol stack according to the action in the local in-band control matching table entry. After detecting disconnection of an out-band connection with a forwarding device, the controller may send a neighbor in-band control matching table entry having the highest priority to the first matching table of each forwarding device adjacent to the disconnected forwarding device. In the neighbor in-band control matching table entry, a match field is set to indicate matching the destination address of a packet with the address of the controller, e.g., in the form of a "destination address: address value" in which the address value is the address of the controller, and an action indicates sending a whole packet to the controller.

After receiving the SDN packet from the first forwarding device, the adjacent forwarding device selected by the first forwarding device may find the destination IP address of the SDN packet matches with the neighbor in-band control matching table entry having the highest priority in the first matching table, and send the SDN packet to the controller via a management interface of the adjacent forwarding device according to the action in the neighbor in-band control matching table entry. The SDN response packet is created by the controller after the controller receives the SDN packet, and is sent to the adjacent forwarding device selected by the first forwarding device.

In an example, the out-band connection switching module 72 may select an interface having the largest idle bandwidth per unit-time from interfaces connecting the forwarding device with adjacent forwarding devices according to workload conditions of the interfaces, and take the adjacent forwarding device connected to the interface as the second forwarding device.

The out-band connection switching module 72 may re-select an adjacent forwarding device from all of adjacent forwarding devices if no response packet is received within a pre-defined time period after sending the SDN packet to the selected adjacent forwarding device, and re-send the SDN packet to the newly selected adjacent forwarding device.

In an example, the out-band connection switching module 72 may send the SDN packet to all of adjacent forwarding devices. The SDN packet is forwarded to the controller by an adjacent forwarding device selected by the controller. The controller may select one from forwarding devices adjacent to the disconnected forwarding device after detecting disconnection of an out-band connection with the forwarding device, and send a neighbor in-band control matching table entry having the highest priority to the first matching table in the selected forwarding device. In the neighbor in-band control matching table entry, a match field is set to indicate matching the destination address of a packet with the address of the controller, e.g., in the form of a "destination address: address value" in which the address value is the address of the controller, and an action indicates sending a whole packet to the controller. As such, the selected forwarding device is enabled to forward the SDN packet of the forwarding device whose out-band connection is disconnected.

The out-band connection monitoring module 71 may perform handshake with the controller via a management interface after detecting the out-band connection with the controller recovers, remove the local in-band control matching table entry in the first matching table in the matching table maintaining module 73 as instructed by the controller if the handshake is successful, and exchange SDN packets with the controller via the management interface.

The forwarding device as shown in FIG. 7 may also include a protocol packet in-band forwarding module (which is not shown in FIG. 7). The protocol packet in-band forwarding module receives an SDN packet sent by an adjacent forwarding device, determines a destination address in the SDN packet matches with a neighbor in-band control matching table entry having the highest priority in the first matching table in the matching table maintaining module 73, sends the SDN packet to the controller according to an action in the neighbor in-band control matching table entry. The protocol packet in-band forwarding module may encapsulate the SDN packet into a packet-in packet, configure a field of the packet-in packet to identify an ingress interface of the forwarding device via which the SDN packet is received, and send the packet-in packet to the controller via the management interface of the forwarding device. The protocol packet in-band forwarding module may receive a packet-out packet sent by the controller. The packet-out packet may include a response packet responsive to the SDN packet, and an action to be performed on the response packet. The action is forwarding the response packet to an egress interface. The egress interface is the ingress interface identified by the packet-in packet. The protocol packet in-band forwarding module may forward the response packet to the egress interface according to the action in the packet-out packet.

The matching table maintaining module 73 may receive and store the neighbor in-band control matching table entry having the highest priority sent by the controller to the first matching table. In the neighbor in-band control matching table entry, a match field is set to indicate matching the destination address of a packet with the address of the controller, e.g., in the form of a "destination address: address value" in which the address value is the address of the controller, and an action indicates sending the whole packet to the controller.

The forwarding device may not only process the disconnection of out-band connection between the forwarding device and the controller, but also forward packets exchanged between the controller and an adjacent forwarding device whose out-band connection is disconnected when the out-band connection of the forwarding device is working normally.

Figure 9:
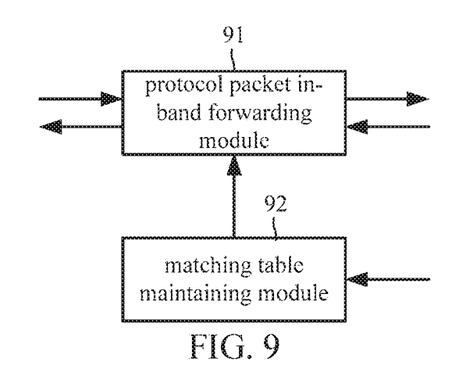
FIG. 9 is a schematic diagram illustrating modules of a forwarding device in accordance with various examples of the present disclosure.

FIG. 9 is a schematic diagram illustrating modules of a forwarding device in accordance with various examples of the present disclosure. The forwarding device may be arranged in an SDN. The forwarding device is controlled by a controller via out-band control. As shown in FIG. 9, the forwarding device may include: a protocol packet in-band forwarding module 91 and a matching table maintaining module 92.

The matching table maintaining module 92 receives and stores a neighbor in-band control matching table entry sent by a controller. In the neighbor in-band control matching table entry, a match field is set to indicate matching the destination address of a packet with the address of the controller, e.g., in the form of a "destination address: address value" in which the address value is the address of the controller, and an action indicates sending a whole packet to the controller. The priority of the neighbor in-band control matching table entry may be set to be the highest priority.

The protocol packet in-band forwarding module 91 receives an SDN packet, e.g., an OpenFlow packet, sent by an adjacent forwarding device, sends the SDN packet to the controller via a management device of the forwarding device based on the neighbor in-band control matching table entry if the destination address of the SDN packet is the address of the controller.

In an example, the protocol packet in-band forwarding module 91 receives an SDN packet sent by an adjacent forwarding device, determines the destination address of the SDN packet matches with the neighbor in-band control matching table entry having the highest priority in the first matching table in the matching table maintaining module 92. According to an action in the neighbor in-band control matching table entry which indicates sending the whole packet to the controller, the protocol packet in-band forwarding module 91 may encapsulate the SDN packet into a packet-in packet, configure a field of the packet-in packet to identify an ingress interface of the forwarding device via which the SDN packet is received, and send the packet-in packet to the controller via the management interface of the forwarding device. The protocol packet in-band forwarding module 91 may receive a packet-out packet sent by the controller. The packet-out packet may include a response packet responsive to the SDN packet, and an action to be performed on the response packet. The action is forwarding the response packet to an egress interface. The egress interface is the ingress interface identified by the packet-in packet. The protocol packet in-band forwarding module 91 may forward the response packet to the egress interface according to the action in the packet-out packet.

Figure 10:
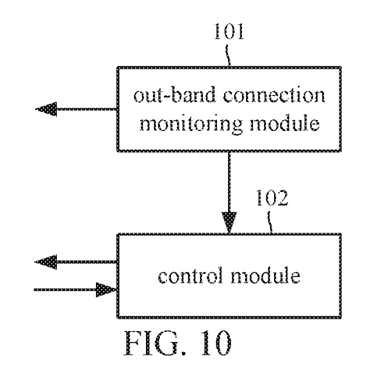
FIG. 10 is a schematic diagram illustrating modules of a controller in accordance with various examples of the present disclosure.

FIG. 10 is a schematic diagram illustrating modules of a controller according to examples of the present disclosure. The controller may be deployed in an SDN. At the beginning, the controller controls forwarding devices via out-band control. As shown in FIG. 10, the controller may include: an out-band connection monitoring module 101 and a controlling module 102.

The out-band connection monitoring module 101 detects disconnections of an out-band connection with a forwarding device, adds the address of the forwarding device into an address list of disconnected out-band connections, and sends a neighbor in-band control matching table entry to matching tables of all of forwarding devices adjacent to the forwarding device. In the neighbor in-band control matching table entry, a match field is set to indicate matching the destination address of a packet with the address of the controller, e.g., in the form of a "destination address: address value" in which the address value is the address of the controller, and an action indicates sending a whole packet to the controller. Alternatively, the out-band connection monitoring module 101 may select one of the adjacent forwarding devices of the forwarding device, and send a neighbor in-band control matching table entry to the selected adjacent forwarding device. In the neighbor in-band control matching table entry, a match field is set to indicate matching the destination address of a packet with the address of the controller, e.g., in the form of a "destination address: address value" in which the address value is the address of the controller, and an action indicates sending a whole packet to the controller.

The controlling module 102 receives an SDN packet, e.g., an OpenFlow packet sent by a forwarding device, processes the SDN packet after determining a source address of the SDN packet is in the address list of disconnected out-band connections in the out-band connection monitoring module 101, and sends a response packet to the forwarding device so that the forwarding device sends the response packet to an adjacent forwarding device that initiated the SDN packet. The SDN packet was received by the forwarding device from the adjacent forwarding device. The destination IP address of the SDN packet matches with a neighbor in-band control matching table entry having the highest priority in the first matching table in the forwarding device. The SDN packet is then sent to the controller according to the action in the neighbor in-band control matching table entry. The forwarding device is selected by the adjacent forwarding device from adjacent forwarding devices of the adjacent forwarding device after the adjacent forwarding device detects disconnection of an out-band connection between the adjacent forwarding device and the controller. The SDN packet, which was supposed to be sent via a management interface of the adjacent forwarding device, was then sent to the forwarding device selected by the adjacent forwarding device or to all of forwarding devices adjacent to the adjacent forwarding device.

The out-band connection monitoring module 101 may perform handshake with a forwarding device after detecting an out-band connection with the forwarding device has recovered, and instruct an adjacent forwarding device of the forwarding device to remove a neighbor in-band control matching table entry in which the destination IP address is the IP address of the controller if the handshake is successful.

The controlling module 102 may send a connection disconnected indication which includes the address of a forwarding device whose out-band connection is disconnected to the out-band connection monitoring module 101 after detecting no SDN packet or Keep-Alive packet is received from the forwarding device within a pre-defined period of time.

The out-band connection monitoring module 101 may receive the connection disconnected indication sent by the controlling module 102, re-send the neighbor in-band control matching table entry to all of adjacent forwarding devices of the forwarding device or to a new selected adjacent forwarding device of the forwarding device via respective management interfaces.

In one example, said the controlling module 102 receives an SDN packet sent by a forwarding device is: the controlling module 102 may receive a packet-in packet sent by the forwarding device via a management interface. The packet-in packet includes the SDN packet and information identifying an ingress interface of the forwarding device via which the SDN packet is received. And the process of the controlling module 102 sending a response packet to the forwarding device may include: the controlling module 102 encapsulates the response packet and an action into a packet-out packet. The action may be forwarding the response packet to an egress interface. The egress interface is the ingress interface identified by the packet-in packet.

Figure 8:
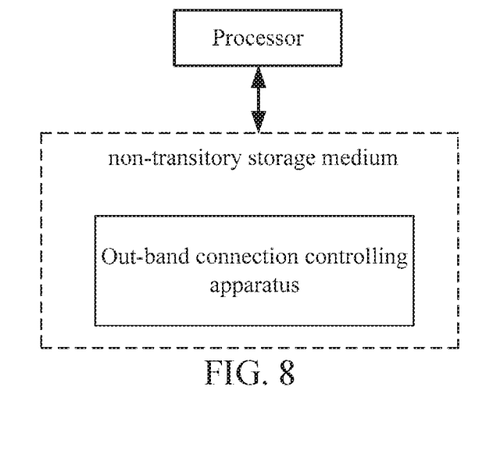
FIG. 8 is a schematic diagram illustrating modules of a forwarding device in accordance with various examples of the present disclosure.

FIG. 8 is a schematic diagram illustrating modules of a forwarding device in accordance with various examples of the present disclosure. The forwarding device may include a processor and a non-transitory storage medium coupled to the processor. The storage stores a series of machine-readable instructions executable by the processor to:

detect disconnection of an out-band connection between the forwarding device and a controller, send an SDN packet to the controller via an out-band connection of an adjacent forwarding device, and receive a response packet sent by the controller via the adjacent forwarding device.

In an example, the machine-readable instructions may also be executable by the processor to:

create a local in-band control matching table entry in a matching table of the forwarding device, and send the response packet to a local processing logic for processing according to the local in-band control matching table entry; wherein in the local in-band control matching table entry, a match field is set to indicate matching a source address of a packet with an address of the controller, and an action is set to indicate sending a packet to the local processing logic.

In an example, the machine-readable instructions may also be executable by the processor to:

select one of adjacent forwarding devices as the adjacent forwarding device, send the SDN packet to the adjacent forwarding device which sends the SDN packet to the controller via the out-band connection of the adjacent forwarding device.

In an example, the machine-readable instructions may also be executable by the processor to:

send the SDN packet to all of adjacent forwarding devices so that one of the adjacent forwarding devices selected by the controller sends the SDN packet to the controller via the out-band connection of the adjacent forwarding device selected by the controller.

In an example, the machine-readable instructions may also be executable by the processor to:

receive and store a neighbor in-band control matching table entry sent by the controller in which a match field indicates matching a destination address of a packet with the destination address of the controller and an action is sending a whole packet to the controller, receive an SDN packet sent by an adjacent forwarding device, send the SDN packet to the controller via a management interface of the forwarding device according to the neighbor in-band control matching table entry, receive a response packet sent by the controller responsive to the SDN from the adjacent forwarding device, and forward the response packet to the adjacent forwarding device from which the SDN packet was received.

The set of machine-readable instructions in the storage may be integrated in the form of an out-band connection controlling apparatus, e.g., an executable file or a software program.

Figure 11:
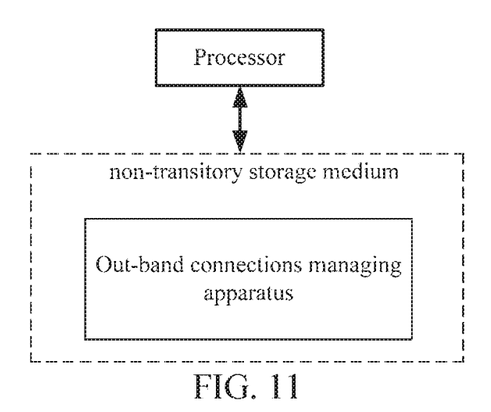
FIG. 11 is a schematic diagram illustrating modules of a controller in accordance with various examples of the present disclosure.

FIG. 11 is a schematic diagram illustrating modules of a controller in accordance with various examples of the present disclosure. The controller may include a processor and a non-transitory storage medium coupled to the processor. The storage stores a series of machine-readable instructions executable by the processor to:

detect disconnection of an out-band connection between the controller and a first forwarding device, add an address of the first forwarding device into an address list of disconnected out-band connections; receive an SDN packet sent by a second forwarding device, process the SDN packet if a source address of the SDN packet is in an address in the address list, send a response packet to the second forwarding device which sends the response packet to an adjacent forwarding device from which the SDN packet was received; wherein the SDN packet is received by the second forwarding device from the adjacent forwarding device, and is sent to the controller according to a neighbor in-band control matching table entry in a matching table of the second forwarding device after the second forwarding device determines a destination address of the SDN packet matches with the neighbor in-band control matching table entry; in the neighbor in-band control matching table entry, a match field is set to indicate matching the destination address of a packet with the address of the controller and an action is sending a whole packet to the controller.

In an example, the machine-readable instructions may also be executable by the processor to:

after detecting disconnections of an out-band connection between the controller and the first forwarding device, send a neighbor in-band control matching table entry to matching tables of all of forwarding devices adjacent to the first forwarding device.

In an example, the machine-readable instructions may also be executable by the processor to:

after detecting disconnections of an out-band connection between the controller and the first forwarding device, select one of all of forwarding devices adjacent to the first forwarding device, and send a neighbor in-band control matching table entry to a matching table of the selected forwarding device.

In an example, the machine-readable instructions may also be executable by the processor to:

parse a received packet-in packet which includes the SDN packet and information identifying an ingress interface of the second forwarding device via which the SDN packet was received; encapsulate the response packet and an action into a packet-out packet, wherein the action is set to indicate sending the response packet to an egress interface which is the ingress interface identified by the packet-in packet.

The set of machine-readable instructions in the storage may be integrated in the form of an out-band connections managing apparatus, e.g., an executable file or a software program.

It should be understood that in the above processes and structures, not all of the procedures and modules are necessary. Certain procedures or modules may be omitted according to the needs. The order of the procedures is not fixed, and can be adjusted according to the needs. The modules are defined based on function simply for facilitating description. In implementation, a module may be implemented by multiple modules, and functions of multiple modules may be implemented by the same module. The modules may reside in the same device or distribute in different devices. The hardware modules according to various examples may be implemented by hardware or a hardware platform with necessary software. The software may include machine-readable instructions which are stored in a non-statutory storage medium. Thus, the examples may be embodied as software products.

In various examples, the hardware may be dedicated hardware or general-purpose hardware executing machine-readable instruction. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A module may also comprise programmable logic or circuitry (e.g., as encompassed within a general-purpose processor or other programmable processor) that is temporarily configured by software to perform certain operations.

The machine-readable instructions corresponding to modules as shown in FIG. 8 and FIG. 11 may cause an operating system running in a computer to implement part or all of the operations described herein. A non-transitory computer-readable storage medium may be a storage device in an extension board inserted in the computer or a storage in an extension unit connected to the computer. In this example, a CPU in the extension board or the extension unit executes at least part of the operations according to the instructions based on the program codes to realize the technical scheme of any of the above examples.

The non-transitory computer-readable storage medium for providing the program codes may include floppy disk, hard drive, magneto-optical disk, compact disk (such as CD-ROM, CD-R, CD-RW, DVD-ROM, DVD-RAM, DVD-RW, DVD+RW), magnetic tape drive, Flash card, ROM and so on. Optionally, the program code may be downloaded from a server computer via a communication network.

The scope of the claims should not be limited by the embodiments set forth in the examples, but should be given the broadest interpretation consistent with the description as a whole.

The invention claimed is:

1. A method for controlling forwarding devices in a software defined network (SDN), comprising:

detecting, by a first forwarding device, disconnection of an out-band connection between the first forwarding device and a controller, selecting, by the first forwarding device, a second forwarding device of a plurality of adjacent forwarding devices, to which to forward an SDN packet to the controller via an out-band connection of the second forwarding device, wherein just one of the adjacent forwarding devices is selected, sending the SDN packet from the first forwarding device to the controller via the out-band connection of the second forwarding device, comprising sending, by the second forwarding device, the SDN packet to the controller via a management interface of the second forwarding device according to a neighbor in-band control matching table entry after receiving the SDN packet; wherein upon detecting, at the controller, the disconnection of the out-band connection between the first forwarding device and the controller, the neighbor in-band control matching table entry is sent by the controller to a matching table of the second forwarding device; in the neighbor in-band control matching table entry, a match field is set to indicate matching a destination address of a packet with an address of the controller, and an action is set to indicate sending a whole packet to the controller, and receiving a response packet sent by the controller via the second forwarding device.

2. The method of claim 1, further comprising: creating, by the first forwarding device, a local in-band control matching table entry in a matching table in the first forwarding device, wherein in the local in-band control matching table entry, a match field is set to indicate matching a source address of a packet with the address of the controller, and an action is set to indicate sending a packet to a local processor; and sending, by the first forwarding device, the response packet to the local processor for processing according to the local in-band control matching table entry.

3. The method of claim 2, wherein the sending by the first forwarding device the SDN packet to the controller via the out-band connection of the second forwarding device comprises:

selecting, by the first forwarding device, one of adjacent forwarding devices of the first forwarding device as the second forwarding device, sending the SDN packet to the second forwarding device which sends the SDN packet to the controller via the out-band connection of the second forwarding device.

4. The method of claim 2, wherein the sending by the first forwarding device the SDN packet to the controller via the out-band connection of the second forwarding device comprises:

sending, by the first forwarding device, the SDN packet to all of adjacent forwarding devices of the first forwarding device, and sending, by the second forwarding device, the SDN packet to the controller via the out-band connection of the second forwarding device; wherein the second forwarding device is selected by the controller from all of the adjacent forwarding devices of the first forwarding device after the controller detected the disconnection of the out-band connection between the controller and the first forwarding device.

5. A forwarding device in a software defined network (SDN), comprising a processor and a non-transitory storage medium coupled to the processor, the non-transitory storage medium stores machine-readable instructions executable by the processor to:

detect disconnection of an out-band connection between the forwarding device and a controller, select an adjacent forwarding device of a plurality of adjacent forwarding devices to which to forward an SDN packet to the controller via an out-band connection;

send the SDN packet to the controller via the out-band connection of the selected adjacent forwarding device, wherein just one of the plurality of adjacent forwarding devices is selected as the adjacent forwarding device, by sending the SDN packet to the selected adjacent forwarding device which sends the SDN packet to the controller via the out-band connection of the selected adjacent forwarding device according to a neighbor in-band control matching table entry sent to the selected adjacent forwarding device from the controller upon detecting, at the controller, the disconnection of the out-band connection between the forwarding device and the controller, and receive a response packet sent by the controller via the adjacent forwarding device.

6. The forwarding device of claim 5, wherein the machine-readable instructions are executable by the processor to:

create a local in-band control matching table entry in a matching table of the forwarding device, and send the response packet to a local processing logic for processing according to the local in-band control matching table entry; wherein in the local in-band control matching table entry, a match field is set to indicate matching a source address of a packet with an address of the controller, and an action is set to indicate sending a packet to the local processing logic.

7. The forwarding device of claim 5, wherein the machine-readable instructions are executable by the processor to:

receive and store a neighbor in-band control matching table entry sent by the controller in which a match field is set to indicate matching a destination address of a packet with an address of the controller and an action is set to indicate sending a whole packet to the controller, receive the SDN packet sent by the adjacent forwarding device, send the SDN packet to the controller via a management interface of the forwarding device according to the neighbor in-band control matching table entry, receive the response packet sent by the controller responsive to the SDN packet from the adjacent forwarding device, and forward the response packet to the adjacent forwarding device from which the SDN packet was received.

8. The forwarding device of claim 5, wherein the just one of the adjacent forwarding devices is selected based on workload conditions between interfaces of the forwarding device and the adjacent forwarding devices.

9. The forwarding device of claim 5, wherein the just one of the adjacent forwarding devices is selected as the adjacent forwarding device having a largest idle bandwidth per unit time.

10. A non-transitory computer-readable data storage medium storing machine-executable instructions executable by a processor of a first forwarding device to:

detect disconnection of an out-band connection between the first forwarding device and a controller, select a second forwarding device of a plurality of adjacent forwarding devices, to which to forward an SDN packet to the controller via an out-band connection of the second forwarding device, wherein just one of the adjacent forwarding devices is selected, send the SDN packet from the first forwarding device to the controller via the out-band connection of the second forwarding device, comprising sending, by the second forwarding device, the SDN packet to the controller via a management interface of the second forwarding device according to a neighbor in-band control matching table entry after receiving the SDN packet; wherein the neighbor in-band control matching table entry is sent by the controller to a matching table of the second forwarding device upon detecting at the controller, the disconnection of the out-band connection between the first forwarding device and the controller; in the neighbor in-band control matching table entry, a match field is set to indicate matching a destination address of a packet with an address of the controller, and an action is set to indicate sending a whole packet to the controller, and receive a response packet sent by the controller via the second forwarding device.

11. The medium of claim 10, wherein the instructions are executable by the processor to further:

create a local in-band control matching table entry in a matching table in the first forwarding device, wherein in the local in-band control matching table entry, a match field is set to indicate matching a source address of a packet with the address of the controller, and an action is set to indicate sending a packet to a local processor; and send the response packet to the local processor for processing according to the local in-band control matching table entry.

12. The medium of claim 11, wherein the processor is to send the SDN packet to the controller via the out-band connection of the second forwarding device by:

selecting one of adjacent forwarding devices of the first forwarding device as the second forwarding device, sending the SDN packet to the second forwarding device which sends the SDN packet to the controller via the out-band connection of the second forwarding device.

13. The medium of claim 11, wherein the processor is to send the SDN packet to the controller via the out-band connection of the second forwarding device by:

sending the SDN packet to all of adjacent forwarding devices of the first forwarding device, and sending, by the second forwarding device, the SDN packet to the controller via the out-band connection of the second forwarding device; wherein the second forwarding device is selected by the controller from all of the adjacent forwarding devices of the first forwarding device after the controller detected the disconnection of the out-band connection between the controller and the first forwarding device.

\* \* \* \* \*